Figure 5:
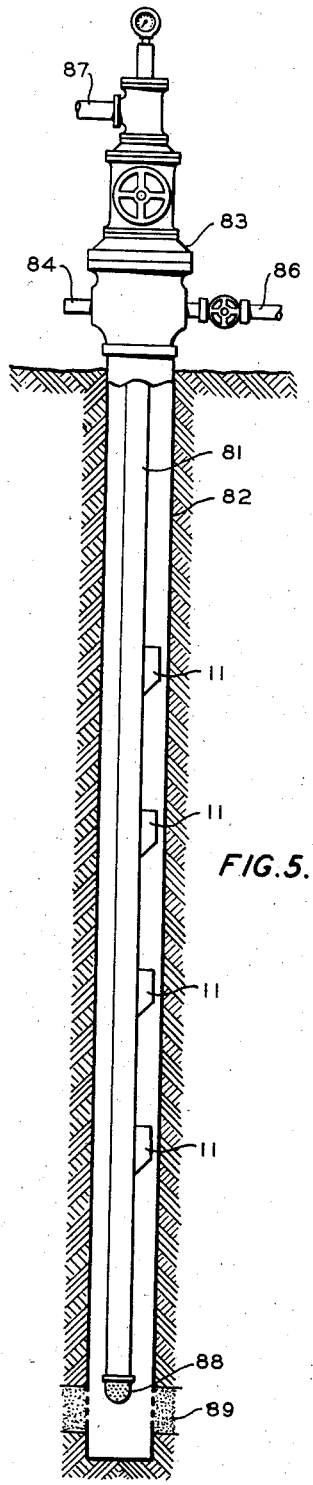

Sept. 16, 1958

C. H. KANGAS 2,851,959

MOTOR DRIVEN GAS LIFT VALVE

Filed July 15, 1954

3 Sheets-Sheet 1

INVENTOR.
C. H. KANGAS

BY *Hudson and Young*

ATTORNEYS

Sept. 16, 1958  C. H. KANGAS  2,851,959
MOTOR DRIVEN GAS LIFT VALVE
Filed July 15, 1954  3 Sheets-Sheet 2

INVENTOR.
C. H. KANGAS
BY *Hudson & Young*
ATTORNEYS

INVENTOR.
C. H. KANGAS
BY Hudson End Young
ATTORNEYS

United States Patent Office 2,851,959
Patented Sept. 16, 1958

2,851,959
MOTOR DRIVEN GAS LIFT VALVE

Charles H. Kangas, Bartlesville, Okla., assignor to Phillips Petroleum Company, a corporation of Delaware Application July 15, 1954, Serial No. 443,540

20 Claims. (Cl. 103—233)

This invention relates to apparatus for reciprocating a movable member such as a valve stem. A specific aspect of the invention pertains to a motor driven gas lift valve.

In the operation of gas lift wells it is often desirable to provide downhole valves controlling the admission of gas to the flow stream. Due to space limitations within the well casing it is difficult to design or devise a valve which supplies a sufficient starting force to move the valve off its seat and which will also move the valve the necessary distance to the full open position. The large starting force required is due to the valve head sticking to the valve seat or to the pressure of the lifting gas tending to hold the valve closed or to a combination of the two factors. Because of the limited space within a well casing or earth bore hole, the valve diameter is often restricted to the range of 2-3 inches, and the problem of devising or designing an electric motor-driven valve-operating mechanism for a gas-lift valve to be used in a well is a substantial one.

It is an object of the invention to provide an improved apparatus for reciprocating a movable member against high resistance with a relatively small force. Another object is to provide an improved apparatus for operating a valve against a high resistance force with a relatively small force. A further object of the invention is to provide an improved apparatus for introducing a fluid under pressure to a well tubing. It is also an object of the invention to provide an improved motor driven gas lift valve. Another object is to provide an improved lever system. Other objects of the invention will become apparent from a consideration of the accompanying disclosure.

The present invention comprises a motor driven screw-and-lever linkage connecting the motor with a reciprocable member, such as a valve stem or head, in such a manner that the valve is moved very slowly but with a large force. One embodiment of the invention comprises an arrangement of a screw-and-lever-linkage which connects a motor with a valve head so as to move the valve very slowly with a large force while the head is close to the seat, but more rapidly when the head is removed a short space from the seat.

The apparatus comprises essentially a narrow elongated tube attached to a well tubing, either exterior thereto or within an expanded section of the well tubing. This elongated narrow tube houses the valve and operating mechanism. In a preferred arrangement the motor is positioned at the upper end of the tube and is connected by means of a geared drive and bearing assembly through a flexible coupling to an elongated screw. A nut which rides along the screw upon turning of the screw is pivotally attached to a generally transverse lever which is pivoted at the opposite end and pivotally connected intermediate its ends with a generally longitudinal linking arm. This linking arm is pivotally connected at the other end to another lever which is pivotally connected to the valve stem of the valve assembly. This latter lever operates on a fulcrum extending inwardly from a wall of the tube while the other lever operates on a fulcrum extending inwardly, usually, from the opposite wall of the tube. The multiplication of the applied force of the motor depends upon the relative lengths of the effort arms and the resistance arms of the two levers, and it is obviously desirable to arrange the levers and the linkage with respect to the fulcrums so as to obtain a sufficiently high mechanical advantage to adequately multiply the torque of the motor as it is translated to pull on the valve stem.

Figure 1:
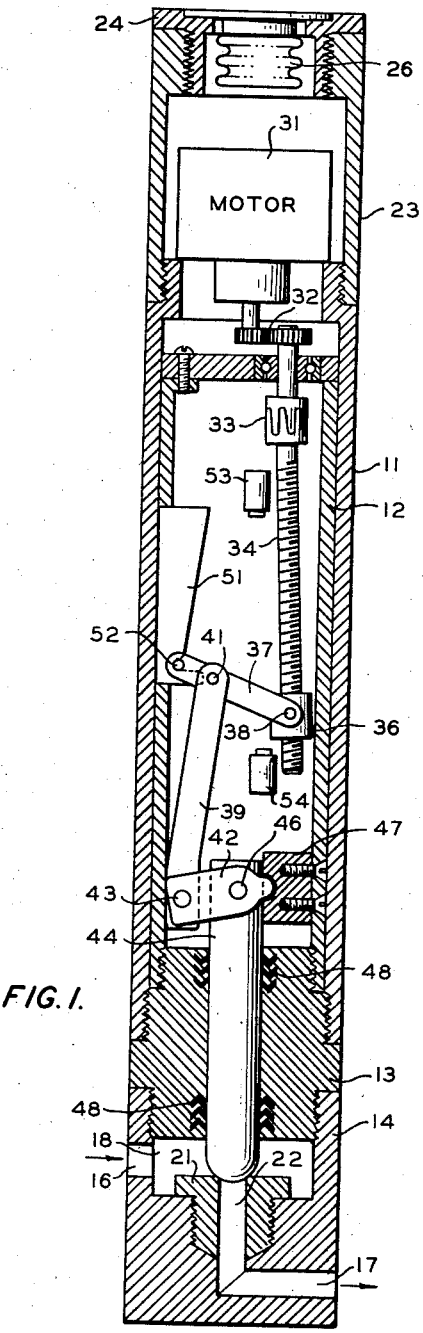
Figure 2:
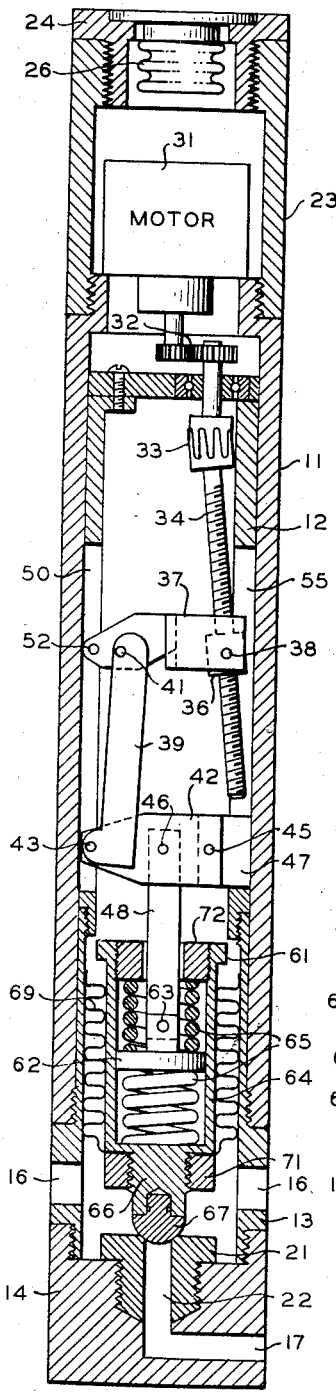
Figure 3:
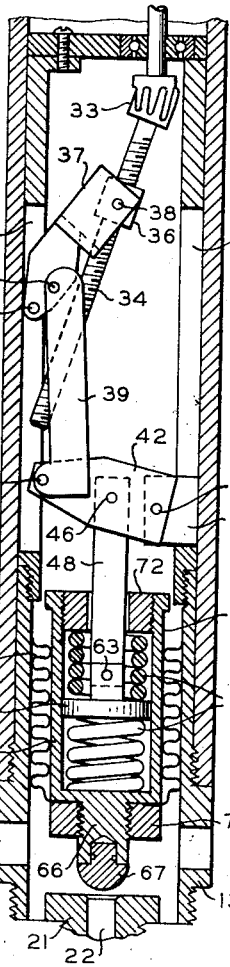
Figure 4:
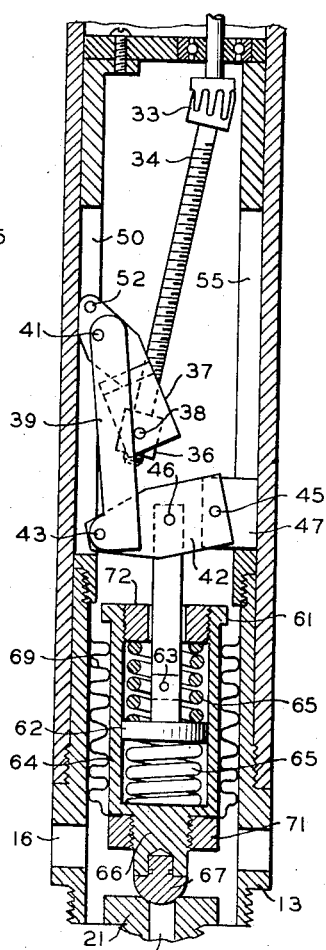
Figure 6:
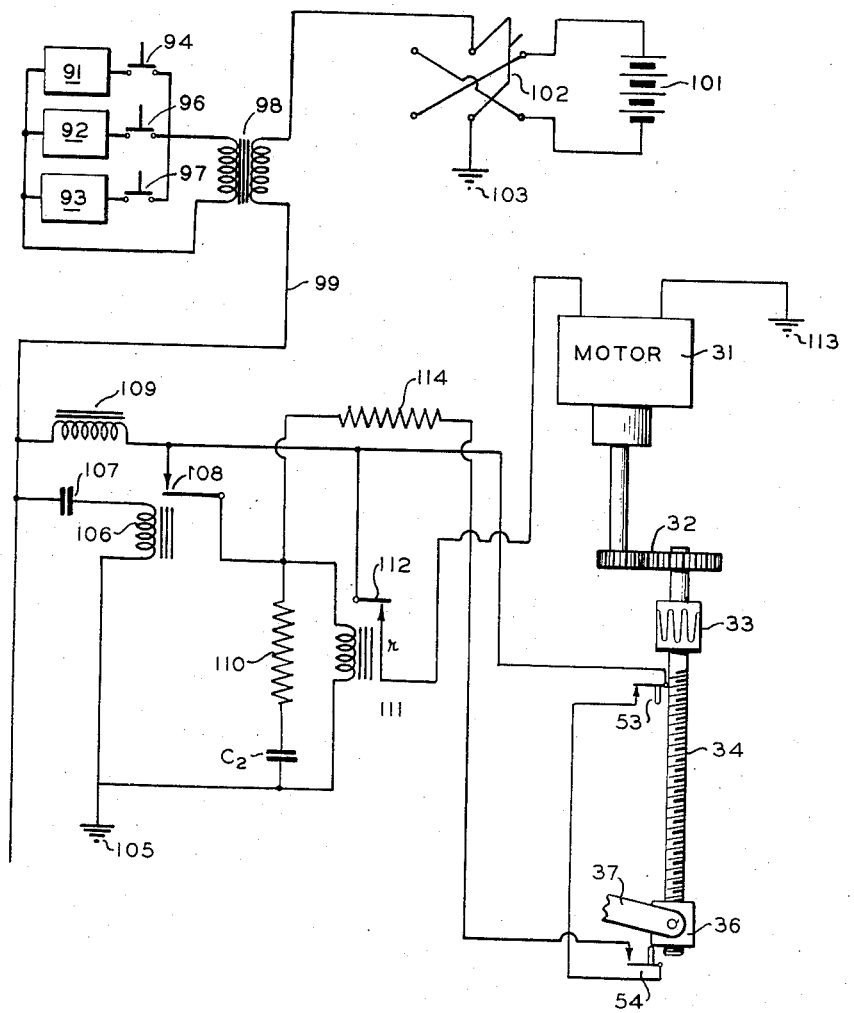

A more complete understanding of the invention may be had from a consideration of the accompanying drawing of which Figure 1 is an elevation partly in section showing a schematic arrangement of a preferred embodiment of the invention; Figure 2 is a similar view of another embodiment of the invention; Figures 3 and 4 are partial views of the device of Figure 2 with the mechanism in different steps of operation; Figure 5 is an elevation partly in section of a well showing the gas lift valves in position on the tubing; and Figure 6 is a wiring diagram for the operation of the motor and apparatus of the previous figures.

Referring to Figure 1, a closed shell or tube 11 containing a liner 12 houses the motor and valve operating mechanism. The lower end of the tube is closed by member 13 to which is screwed the liner 12 and the assembly including 12 and 13 is screwed into the lower end of shell or tube 11. Member 13 provides a bearing or guide for the valve stem. Another member 14 provides inlet and outlet ports 16 and 17, respectively, and houses valve seat 21 through which passageway 22 passes, thereby connecting ports 16 and 17 through chamber 18 around the valve seat.

A motor housing 23 is screwed on to the upper offset end of tube 11 to enclose motor 31. An end enclosure member 24, containing a bellows 26, is screwed into the upper end of housing 23. It may be considered that the shell of housing 23 and of member 14 are an extension of tube wall 11.

Motor 31 may be any small motor, a 27 volt D. C. motor with speed reduction to 145 R. P. M. having been satisfactory in one application. Motor 31 is affixed by any suitable method within housing 23. This motor is connected by means of geared drive and bearing assembly 32 and universal joint 33 to an elongated screw 34. A thrust bearing (not shown) in assembly 32 prevents longitudinal movement thereof. Nut 36 rides on screw 34 upon turning of the screw and is pivotally connected to lever 37 at pivot 38 and lever 37 is pivotally connected with linking member 39 at pivot 41. Linking member 39 is connected with lever 42 at pivot 43. Lever 42 is pivotally attached to valve stem 44 at pivot 46. Fulcrum 47 affixed to liner 12 by any suitable means provides a receptacle for the nose of lever 42. Chevron type sealing rings 48 provide a seal around valve stem 44, thereby preventing leakage of fluid into tube 11 from the lower end.

In order to provide a fulcrum for lever 37, member 51 is recessed in the inner wall 12 of tube 11 and provides a receptacle for pivot 52 positioned in the end of lever 37. This receptacle provides both a lower and an upper shoulder transverse of the tube so as to provide for application of force on linkage member 39 in either longitudinal direction of the tube, but is open inwardly so that, as nut 36 advances up screw 34 to its uppermost position, pin 52 pulls out of the fulcrum receptacle so as to permit straightening out of the linkage. Pin 52 is extended so as to engage the adjacent edge of linking member 39 when the linkage is straightened out, thereby preventing the linkage from passing center and assuring the return of pin 52 to the fulcrum receptacle upon return of nut 36 to its lowermost position. The oblique inner edge of fulcrum member 51 also assists in directing pin 52 to the fulcrum receptacle.

Limit switches 53 and 54 which are connected in the circuit shown in Figure 6 function to control the limits of operation of nut 36 and therefore the upper and lower limits of movement of valve stem 44. These limit switches may be placed on screw 34 or may be affixed to the wall of tube 11 and are adjusted so as to contact nut 36 when valve stem 44 has been brought into position so that the head of valve seats on valve seat 21 and to limit the open position of the valve at any desired location.

It is desirable to position pivot 41 considerably closer to pin 52 than to pivot 38 so as to obtain the desired mechanical advantage of the lever and sufficient power to open the valve. Likewise, it is desirable to position pivot 46 on valve stem 44 and lever 42 so as to provide a long arm between pivot 46 and pivot 43 and a considerably shorter arm between pivot 46 and the receptacle in fulcrum 47. When the valve is in the closed position, as shown in Figure 1, and motor 31 is actuated in the proper direction by the electric control, nut 36 ascends screw 34 thereby raising pivots 38 and 41 so as to simultaneously raise pivots 43 and 46. By the system of levers and with proper mechanical advantage built into the system the small force or torque of motor 31 is transformed into a powerful lifting force on pivot 46 and valve stem 44 thereby lifting the valve off seat 21. As nut 36 ascends screw 34, pin 52 is drawn out of its recess in fulcrum 51 thereby straightening out the linkage of lever 37 and linking member 39 so that greater speed and less power is obtained in the linkage movement and, thereby, more rapid movement of valve stem 44 after the valve is unseated and the resistance to unseating has been overcome.

Referring to Figure 2, the construction of the gas lift valve shown is very similar to that shown in Figure 1, the principal difference being in the fixation of pin 52 of lever 37 and pin 45 of lever 42. The valve head assembly of Figure 2 is also more detailed than that of Figure 1. Corresponding parts of Figures 2, 3, 4, 5, and 6 are correspondingly numbered to those in Figure 1.

As mentioned before, one end of lever 37 is fixed by means of pin 52 in a recess in liner 12 or inner wall of tube 11. This recess 50 and recess 55 in the opposite wall of liner 12 provide space for movement of the levers, linkage member 39, and screw 34 when the mechanism is in its extreme positions, as shown in Figures 3 and 4, and in its intermediate position as shown in Figure 2. Fulcrum 47 provides pin 45 which pivotally connects with lever 42 thereby providing a fixed fulcrum. Hence, the levers and linkage in Figures 2, 3 and 4 do not straighten out to provide increased speed with a given turning of screw 34 after the valve head is unseated.

Valve head assembly 61 of Figures 2, 3, and 4 comprises a flanged valve stem 62 resembling a piston which is flexibly attached to valve stem 48 by means of pin 63. A housing 64 having a nose section 66 to which is attached the valve head 67 encloses flanged member 62 and a pair of spiral springs 65 on opposite sides of member 62. Housing 64 is centered in the inner wall of tube 11 by means of bellows 69 which is affixed to the nose section of the housing by means of retaining nut 71. Bellows 69 also functions as a sealing member to prevent passage of fluid into and out of the interior of the tube. Retainer 72 screws into the skirt end of housing 64 so as to complete the housing of the flexible valve stem and spring assembly. The valve head assembly with its flexible stem and springs allows a small amount of overtravel in the operation of the valve mechanism and also acts as a shock absorber to the system.

Figure 2 shows the mechanism in operation on the upstroke before the valve head leaves the seat while Figure 3 shows the valve operating mechanism in the extreme position with the valve open and Figure 4 shows the valve mechanism in the opposite extreme position when the valve head is again brought into contact with the seat and seated.

In the arrangement shown in Figures 1 and 2, port 17 opens through the side of member 14 for connection with an opening or port in the tubing wall of a well. Port 17 may extend through the lower end of member 14 so as to connect with an L-shaped connection in the wall of the well tubing. In some installations the motor driven gas lift valve shown is attached to the outside of the well tubing as shown in Figure 5 and in other installations it is positioned inside of the tubing in an expanded tubing section with either port 17 or 16 connected with the opening in the tubing wall.

Figure 5 shows an installation of a plurality of motor driven gas lift valves 11 on the outer wall of a well tubing 81 inside of casing 82. This well has the usual or conventional Christmas tree 83, including lines 84 and 86 for introducing and exhausting fluid to and from the tubing, and production line 87. Intake 88 in the region of production sand 89 permits the flow of oil into tubing 81. As indicated above, units 11 may be installed within expanded tubing sections.

Referring to Figure 6, oscillators 91, 92, and 93 of different tuned frequencies are connected thru switches 94, 96, and 97, respectively, to a transformer 98. When one of switches 94, 96, or 97 is closed a current of a certain frequency is transmitted thru line 99 to the well circuit as hereinafter described.

The secondary coil of transformer 98 is connected to a battery 101, or other source of direct current, thru a double pole reversible switch 102. Battery 101 is connected to ground 103 thru switch 102. Closing of switch 101 in either position sends a direct current thru line 99, the direction depending upon the position of the switch.

Line 99 connects with one or more motor circuits so as to operate one or a plurality of motors 31 operatively connected to down-hole valves such as those of Figures 1 to 5. An alternating current circuit, containing a tuned relay 106, connects with line 99 and with ground 105. A blocking condenser 107 functions to block the D. C. current from battery 101. Relay 106 is tuned to the frequency of the current from oscillator 91 so that when switch 94 is momentarily closed the signal induced in line 99 is picked up by relay 106 which intermittently closes a vibrator switch 108. When switch 102 is closed, a D. C. current flows thru line 99 and thru a D. C. motor circuit connected to line 99, including an inductance coil 109 which blocks A. C. from the motor circuit. The intermittent closing of switch 108 sends a current thru a conventional relay 111 and to ground 105. A resistor 110 and a condensor are connected across the circuit from switch 108 thru relay 111 to ground 105 so as to provide a flow of current thru relay 111 when switch 108 is intermittently open.

The A. C. circuit just described closes switch 112 in the D. C. circuit connected with motor 31. This circuit connects with ground 113 which is conveniently the well tubing, as is ground 105.

Assuming that switch 102 is closed in the position which operates motor 31 in a direction to raise nut 36, contact between nut 36 and limit switch 54 is broken and switch 54 is closed. This completes a holding circuit thru relay resistor 114 and relay 111 to ground 105 which functions to maintain switch 112 in closed position so as to continue feeding current thru motor 31 until nut 36 contacts switch 53 at the upper extreme position and breaks the circuit so as to break the holding circuit by deenergizing relay 111 and allowing switch 112 to open.

Electrical circuits for operating the motor valve of the invention are more fully disclosed and are claimed in the copending application of B. F. Wiley and F. H. Cullison, Serial No. 451,328, filed, August 23, 1954, now Patent No. 2,803,197.

Certain modifications of the invention will become apparent to those skilled in the art and the illustrative details disclosed are not to be construed as imposing unnecessary limitations on the invention.

I claim:

1. A valve for control of fluid flow comprising an elongated closed tubular member having a fluid inlet and a fluid outlet; a restricted passageway connecting said inlet and said outlet having a valve seat therein; a valve stem positioned longitudinally of said tubular member in slidable relation therewith adapted to engage said seat and close said passageway; means for holding said valve stem in longitudinal alignment with said tubular member and for sealing off said tubular member adjacent said inlet and outlet; a first transverse lever connected by a fixed pivot to said valve stem forming a short and a long arm, the short arm thereof engaging a first fulcrum affixed to the wall of said tubular member; a second transverse lever spaced substantially from said first lever and from said valve stem, said second lever having a pivot at one end adapted to engage a second fulcrum on the wall of said tubular member and, when in transverse position being in engagement with said second fulcrum and extending substantially across said tubular member; an elongated threaded rod extending longitudinally along the wall of said tubular member opposite said second fulcrum; a nut on said rod pivotally connected to the other end of said second lever; a rigid linking member pivoted to the long arm of said first lever and to said second lever at a point closer to said second fulcrum than to said nut; and reversible means for rotating said threaded rod.

2. The apparatus of claim 1 wherein said first fulcrum and said second fulcrums are unattached to said first lever and second lever, respectively, so as to provide for disengagement as said nut moves to an extreme position along said threaded rod remote from said valve stem.

3. The apparatus of claim 1 wherein said fulcrums are affixed to their respective levers.

4. The apparatus of claim 1 wherein said threaded rod is connected by a flexible joint to an electric motor.

5. The apparatus of claim 4 wherein the extreme open and closed positions of said valve are controlled by limit switches operated by said nut.

6. Apparatus adapted to reciprocate a movable member such as a valve stem, comprising in combination an elongated tube enclosing an elongated threaded rod extending longitudinally of said tube adjacent a wall thereof having a nut thereon adapted to move along said rod as the rod is rotated; a first transverse lever pivoted at one end to said nut and at the other end to a first fulcrum fixed on the wall of said tube, the length of said first lever being approximately the internal diameter of said tube so as to permit said nut to pass the point opposite said first fulcrum; a second transverse lever pivotally connected at an intermediate section with said movable member so as to form a short arm and a long arm; a second fulcrum fixed on the wall of said tube and adapted to engage the outer end of said short arm; and a rigid linking member pivoted at one end with an intermediate section of said first lever so as to form a short arm connected with said first fulcrum and at the other end with the outer end of the long arm of said second lever.

7. The apparatus of claim 6 wherein said first fulcrum and said second fulcrum are unattached to their respective levers so as to permit lengthening out the linkage between said nut and said movable member after said nut is moved from its extreme position nearest said second lever, thereby reducing mechanical advantage of said levers and attaining speed of movement of said movable member.

8. The apparatus of claim 7 including an elongated tapered member fixed to the inner wall of said tube and extending longitudinally therewith opposite said threaded rod from said first fulcrum to a point more remote from said second lever, the amount of taper being adjusted so as to guide the pivot on the short arm of said first lever into said first fulcrum upon compression of said linkage from the extended position.

9. The apparatus of claim 7 wherein each said first and said second fulcrum provides a pair of pivot surfaces transverse of said tube and spaced apart a short distance to accommodate the cooperating lever element, thereby providing for forcing said linkage in either direction longitudinally of said tube.

10. The apparatus of claim 6 wherein said first fulcrum and the adjacent pivot on said first lever are unattached thereby permitting said pivot to disengage said fulcrum.

11. The apparatus of claim 6 wherein said second fulcrum and the adjacent pivot on said second lever are unattached thereby permitting said pivot to disengage said fulcrum.

12. The apparatus of claim 6 wherein said first and said second fulcrums are fixed to their respective pivots.

13. The apparatus of claim 6 including a reversible motor in driving communication with said threaded rod.

14. The apparatus of claim 13 including a valve assembly and having as said movable member a valve stem pivotally connected with said intermediate section of said second lever and inlet and exhaust ports in the walls of said tube, said motor and the operating mechanism for said valve stem being sealed in said tube, thereby preventing fluid flow thru the tube.

15. The apparatus of claim 6 including a reversible motor having reversing means in driving communication with said threaded rod disposed in said tube remote from the valve end thereof; a valve assembly having inlet and outlet ports in the walls of said tube and forming a closure for said tube to prevent longitudinal flow therethru, said valve assembly being disposed in said tube adjacent said second lever and having its valve stem as said movable member in actuating communication with said second lever through a pivot in said intermediate section of said second lever, the apparatus thus far described being mounted on the tubing of a well with said exhaust port connected with an opening in said tubing.

16. The apparatus of claim 15 wherein each said first and second fulcrum provides a pair of pivot surfaces transverse of said tubular section and spaced apart a short distance to accommodate the cooperating lever element, thereby providing for forcing said linkage in either direction longitudinally of said tubular section.

17. In combination a well tubing having mounted on the wall thereof spaced along its length a plurality of gas-lift valves, each said valve comprising the apparatus of claim 6 further characterized by including a reversible motor having reversing means in driving communication with said threaded rod disposed in said tube remote from the valve end thereof; a valve assembly having inlet and outlet ports in the walls of said tube in communication with an opening in said tubing to provide for controlled flow of fluid into said tubing, the stem of the valve of said valve assembly being said movable member and said motor and the operating mechanism for said valve stem being sealed in said tube.

18. The apparatus of claim 17 wherein each said first and said second fulcrum provides a pair of pivot surfaces transverse of said tubular section and spaced apart a short distance to accommodate the cooperating lever element, thereby providing for forcing said linkage in either direction longitudinally of said tubular section.

19. A reversible and extensible lever and linkage assembly comprising in combination a lever having a first pivot and a second pivot adjacent opposite ends thereof; an actuating member attached to said first pivot; a linking arm pivotally attached to an intermediate section of said lever; a resistance element pivotally attached to said linking arm at a spaced-apart locus from said lever; and a fulcrum having a seat therein for said second pivot comprising a slotted recess providing opposed resistance shoulders for said second pivot; said actuating member being movable through a limited path from a relatively close position to said resistance element to a remote position thereto, and said second pivot being adapted to seat in said seat in said fulcrum so that said opposed resistance shoulders function alternatively to support said second pivot as said first pivot is moved in alternate directions in said path and to release said second pivot as said first pivot is moved to said remote position so as to provide a direct pull between said first pivot and said resistance element.

20. The assembly of claim 19 wherein the lever arm between said second pivot and said linking arm is shorter than the lever arm between said first pivot and said linking arm.

References Cited in the file of this patent

UNITED STATES PATENTS

| | | |
|---|---|---|
| 1,261,573 | McElwaine | Apr. 2, 1918 |
| 2,005,891 | Elberty | June 25, 1935 |
| 2,278,532 | Crickmer | Apr. 7, 1942 |
| 2,307,171 | Tutton | Jan. 5, 1943 |
| 2,357,021 | Pond | Aug. 29, 1944 |
| 2,598,062 | Krecan | May 27, 1952 |
| 2,658,460 | Davis | Nov. 10, 1953 |